Patented Jan. 24, 1933

1,895,413

UNITED STATES PATENT OFFICE

PETER GEANEAS, OF BROOKLYN, NEW YORK

METHOD OF REMOVING CARBON

No Drawing. Application filed June 23, 1928. Serial No. 287,878.

This invention relates to a method for use in loosening or removing accumulations of carbon from the cylinders and spark plugs of internal combustion engines and for preventing the formation of such deposits and has as one of its objects to provide a hot carbon disintegrating gas, and to introduce the same into the cylinder, which may be produced at an exceptionally low cost and employed in an economical manner and which will effectually serve to effect the removal of carbon deposits and prevent the formation of further deposits of carbon in the internal combustion engine in connection with which it is employed.

In preparing the material embodying the invention, any desired quantity of charcoal is selected and there is poured over the charcoal sufficient natural sea water or saline solution to thoroughly saturate the mass, and after the mass of charcoal has been thoroughly saturated and has taken up all of the sea water which it will absorb and retain in its pores, the surplus water is drained off and the mass of charcoal is permitted to dry. The charcoal, when thoroughly dry, will be crushed or otherwise acted upon to reduce it to particles of a suitable size, and the impregnated charcoal, thus prepared, constitutes the material embodying the invention.

The invention contemplates a method of treating this material effecting combustion of this material and a delivery of the products of combustion into the intake manifold of the internal combustion engine and the combustion of the material is preferably effected in an apparatus which constitutes the subject matter of my co-pending application, Serial No. 287,877, filed June 23, 1928, Pat. No. 1,780,073, Oct. 28, 1930. In the use of the apparatus disclosed in my co-pending application, the material embodying the present invention is introduced into a retort member to which air is supplied by the provision of suitable draft perforations, and means is provided for igniting the mass of the material whereupon the operation of the internal combustion engine will effect further and continued combustion of the material by the drawing in of atmospheric air into the retort through suction which is created by the connection of the retort with the intake manifold of the engine.

I have found that the saline deposits which result from the evaporation of the sea water with which the charcoal is saturated, serve, when subjected to the heat incident to the combustion of the charcoal base, to disintegrate the carbon deposits in the combustion chamber of the engine and on all adjacent interior surfaces that may be coated with carbon deposits.

The charcoal acts as a vehicle or base of the salt and permits the effective burning of the composition, whereby the fumes from the salt can effectively act on the carbon deposits in the engine for loosening the same.

The vapor from the burning mass forms a deposit on the cylinder walls and head of the engine, which tends to prevent the further depositing of carbon thereon.

The volatile gases formed from the combustion of the charcoal and the heated saline composition commingle with the gasoline vapors in the combustion chamber at a very high temperature and a thin film of deposit is formed on the carbon deposit and metal surfaces of the chamber and the adjoining passages, and owing to the soluble qualities of the deposit a continuous action will be produced upon the carbon deposit in the chamber, and will tend to cause its disintegration and protect it from further deposits.

Also whenever moisture enters the chamber and adjoining parts, the metal surfaces being somewhat porous, will absorb a certain proportion of the deposit and will be protected from further deposit of carbon thereon.

Having thus described the invention, what I claim is:

1. The method of removing carbon from internal combustion engines, which consists in burning a composition embodying charcoal impregnated with sea water exteriorly of the engine and drawing the vapors from the burning composition into the engine during the normal running of the engine.

2. The method of distintegrating and loosening a deposit of carbon from the combustion chamber of an explosion engine, consisting in first impregnating a mass of porous inflammable material such as charcoal with a saline solution and drying the same, then burning the inflammable material to volatilize the saline deposit therein and finally introducing the volatile products of combustion and gases derived from heating the saline composition into the combustion chamber of the engine.

3. The method of distintegrating and loosening a deposit of carbon from the combustion chamber of an explosion engine, consisting in first impregnating a mass of porous inflammable material such as charcoal with a saline solution and drying the same, then burning the inflammable material to volatilize the saline deposit therein and finally introducing the volatile products of combustion and gases derived from heating the saline composition into the combustion chamber of the engine, and commingling the hot gases with the vapor of gasoline in the engine to superheat the same and to cause a portion of the saline solution to enter the porous walls of said chamber as moisture enters the chamber.

In testimony whereof I affix my signature.
PETER GEANEAS.